United States Patent
Coon et al.

[11] Patent Number: 5,877,921
[45] Date of Patent: Mar. 2, 1999

[54] HIGH SHOCK SUSPENSION WITH LOAD BEAM SHIELDED FLEXURE

[75] Inventors: Warren Coon; Aman Khan; Koji Iwamoto, all of Temecula, Calif.

[73] Assignee: Magnecomp Corp., Temecula, Calif.

[21] Appl. No.: 872,505

[22] Filed: Jun. 10, 1997

Related U.S. Application Data

[60] Provisional application No. 60/046,442 May 14, 1997.
[51] Int. Cl.⁶ .............................. G11B 5/48; G11B 21/16
[52] U.S. Cl. ............................................................ 360/104
[58] Field of Search .................................. 260/103, 104, 260/105, 106, 107, 109

[56] References Cited

U.S. PATENT DOCUMENTS

| | | | |
|---|---|---|---|
| 4,752,848 | 6/1988 | Garcia et al. | 360/105 |
| 5,027,241 | 6/1991 | Hatch et al. | 360/104 |
| 5,237,472 | 8/1993 | Morehouse et al. | 360/104 |
| 5,291,359 | 3/1994 | Wolter | 360/104 |
| 5,446,611 | 8/1995 | Webber | 360/104 |
| 5,572,387 | 11/1996 | Brooks, Jr. et al. | 360/104 |
| 5,585,980 | 12/1996 | Boutaghou | 360/104 |
| 5,625,514 | 4/1997 | Kubo et al. | 360/104 |
| 5,719,727 | 2/1998 | Budde | 360/104 |
| 5,742,454 | 4/1998 | Vera et al. | 360/104 |

*Primary Examiner*—David L. Ometz
*Attorney, Agent, or Firm*—Louis J. Bachand

[57] ABSTRACT

An improved resonance and non-operating shock performance, low debris-generating disk drive suspension head gimbal assembly for positioning a head at a disk in which the load beam body is locally relieved or deflected to provide shelter for the portion of the flexure usually in the path of the lift arm against debris causing contact of the lift arm with the flexure edges and distortion of the flexure from lift arm contact in a load beam unsupported condition. The local relief reduces the load beam mass for high shock performance; the modification of the load beam contour improves stiffness and thereby improves resonance qualities.

5 Claims, 5 Drawing Sheets

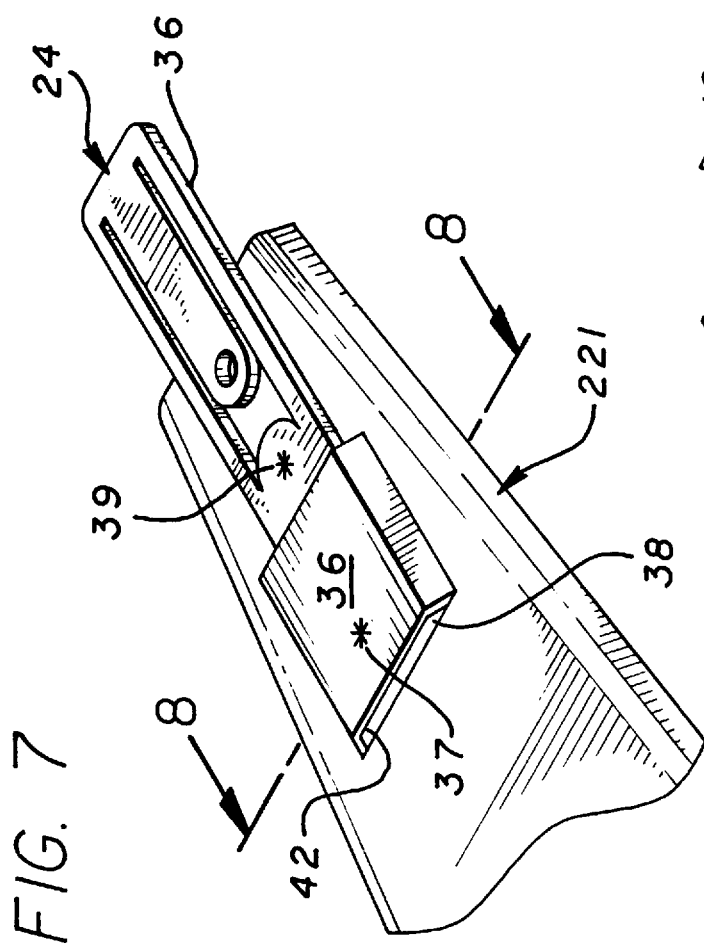
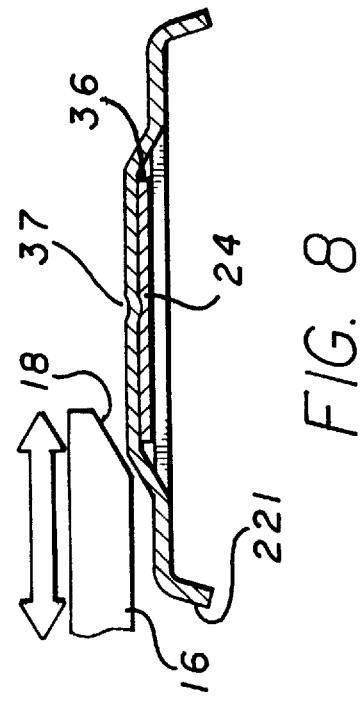

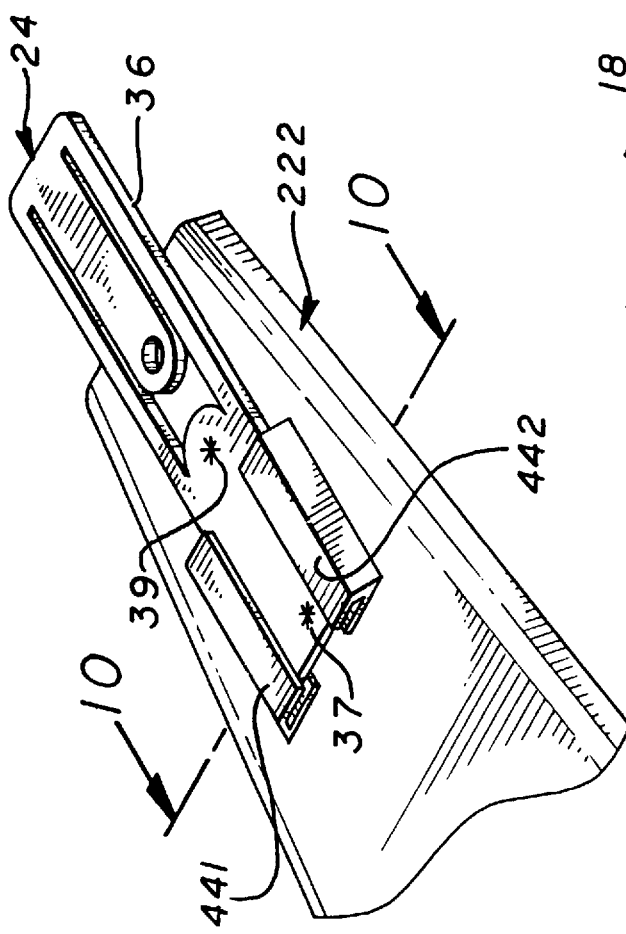
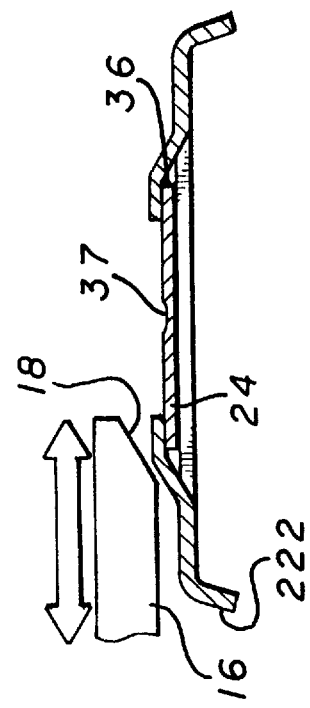
FIG. 9
FIG. 10

HIGH SHOCK SUSPENSION WITH LOAD BEAM SHIELDED FLEXURE

REFERENCE TO RELATED APPLICATION

This application claims the benefit of Provisional Application Ser. No. 60/046,442, filed May 14, 1997.

BACKGROUND OF THE INVENTION

This invention has to do with disk drive suspensions, and more particularly with the protection of the suspension flexure in a disk drive suspension head gimbal assembly. Specifically, the invention provides, for suspension installations where a transverse lift arm is used to lift the suspension load beam away from the disk, the means to avoid debris-generating contact of the lift arm with the flexure edge. The invention further enables avoiding performance-affecting distortion of the flexure that results from contact of the flexure with the lift arm, e.g. where the flexure has previously been unsupported. In accordance with the invention the flexure is supported by the load beam body in the locus of engagement of the lift arm and the flexure portion in the path of the lift arm. The flexure support is realized by modification of the load beam body to accommodate the edge flanges of the flexure in a manner placing the flat of the flexure, that is the portion between the edge flanges, against the opposing load beam surface. Advantages accruing from the invention include less debris generation from the lift arm scraping on the flexure edges. Other advantages include improved resonance values resulting from increased stiffness in the gimbal assembly load beam, and high shock properties in the non-operating mode resulting from reduced mass in the load beam.

Lift arms used to load and unload the suspension from disk cammingly engage the load beam to shift it, and, in the process, rub against the load beam.

In the prior art, flexures have been designed to straddle the load beam portion lying in the path of the lift arms, their rounded edges wrapping the load beam edge for a smoother ride for the lift arm across the suspension. The use of such wide flexures, however, adds mass to the suspension assembly, and higher mass lowers non-operating shock performance. Further, the difficulty of precision fitting a straddling-type of flexure so as to maintain original design values in pitch static attitude and roll static attitude increases manufacturing costs. Fixing the straddling flexure to the load beam involves problematical welding between curved surfaces. Debris may be generated where the lift arm contacts a flexure edge as the scraping action will remove material from the lift arm. This debris may collect in the spaces between the flexure and the load beam where these spaces exist, and cause problems in use of the apparatus. In U.S. Pat. No. 5,386,331 to Wolter, a specially shaped flexure is provided with edge flanges either straight or rolled to carry the lift arm ramp past the etched edges of the flexure.

BRIEF SUMMARY OF THE INVENTION

These and other objects of the invention to become apparent hereinafter are realized in an improved resonance and non-operating shock performance, low debris disk drive suspension head gimbal assembly for positioning a head at a disk, the assembly comprising a longitudinally extended load beam adapted to positioning adjacent the disk, and for carrying the head a longitudinally extended flexure generally parallel with and supported by the load beam, the assembly being adapted for shifting movement relative to the disk upon engagement of a lifting arm cam with the load beam along a predetermined path, the lifting arm being likely to generate debris from contact with an edge of the flexure, the flexure being shielded by the load beam against debris-generating contact between the lifting cam and the flexure during the cam engagement.

In this and like embodiments, typically, the load beam has a recess-defining contour, the contour locally shielding the flexure from lifting arm contact; the flexure has a portion lying across the lifting arm predetermined path, the load beam being locally recessed to receive the flexure portion in protective relation against flexure contact with the lifting arm; the flexure has a portion lying across the lifting arm predetermined path, the load beam being locally deflected to at least partially enclose the flexure portion in protective relation against flexure contact with the lifting arm.

In a particularly preferred embodiment, the invention provides an improved resonance and non-operating shock performance, low debris disk drive suspension head gimbal assembly for positioning a head at a disk, the assembly comprising a longitudinally extended load beam of a given width adapted to positioning adjacent the disk, and for carrying the head a longitudinally extended flexure of a width less than the given width, generally parallel with and supported by the load beam, the assembly being adapted for shifting movement relative to the disk upon engagement of a lifting arm with the load beam along a predetermined path, the lifting arm being likely to distort the flexure or generate debris from contact with an edge of the flexure, the flexure having a flat central portion in supported engagement with the load beam between its edges against flexure distortion, the flexure edges being flanged from the plane of the flexure flat portion, the load beam being locally apertured to receive the flexure flanged edges against debris-generating contact between the lifting arm and the flexure flange edges during the arm engagement.

In this and like embodiments, typically, the load beam defines a pair of spaced slots arranged to receive the flexure flange edges; the flexure flanged edges lie on converging lines, the load beam slots being in registration with the flexure flanged edges; and the assembly is combined with a disk drive and lifting arm.

In a further embodiment, the invention provides an improved resonance and non-operating shock performance, low debris disk drive suspension head gimbal assembly for positioning a head at a disk, the assembly comprising a load beam having an elongated body with side edges in a predetermined generally horizontal plane, a flexure mounted on the body completely inward of the load beam body side edges and arranged for supporting a head in a different plane than the load beam body predetermined plane, the load beam being adapted to lifting away from the disk by a lift arm adjacent the assembly by cam engagement therewith, the flexure being shielded by the load beam against debris generating or distortion producing contact between the lifting arm and the flexure during the cam engagement with the load beam.

In this and like embodiments, typically, the load beam body is locally relieved to bodily receive a portion of the flexure opposite the lift arm in flexure shielding relation.

In preferred embodiments, typically, the load beam body is locally relieved to receive the flexure portion, e.g., the load beam body is locally relieved to define a recess for receiving the flexure portion to a depth greater than the height of the flexure portion, whereby the flexure portion is below the surface plane of the load beam body at the locus of the lift arm cam engagement with the load beam body; or, the flexure portion has side flanges and a flat therebetween, and the load beam body is locally relieved to define a recess for receiving each of the flexure portion side flanges, whereby the flexure portion flat engages the load beam body in supported relation.

In certain other embodiments, typically, the load beam body is locally deflected to bodily embrace a portion of the flexure opposite the lift arm in flexure shielding relation, e.g., the load beam body local deflection fully encloses the flexure portion, or the load beam body local deflection partially encloses the flexure portion.

BRIEF DESCRIPTION OF THE DRAWINGS

The invention will be further described in conjunction with the attached drawings in which:

FIG. 3 is a view taken on line 3 in FIG. 2;

FIG. 7 is a perspective view of the invention disk drive suspension head gimbal assembly, the flexure being fully shielded by a cover formed of a deflected portion of the load beam body;

FIG. 8 is a view taken on line 8—8 in FIG. 7;

FIG. 9 is a perspective view of the invention disk drive suspension head gimbal assembly, the flexure being shielded by deflected portions of the load beam body;

FIG. 10 is a view taken on line 10—10 in FIG. 9;

DETAILED DESCRIPTION OF THE INVENTION

Figure 1:
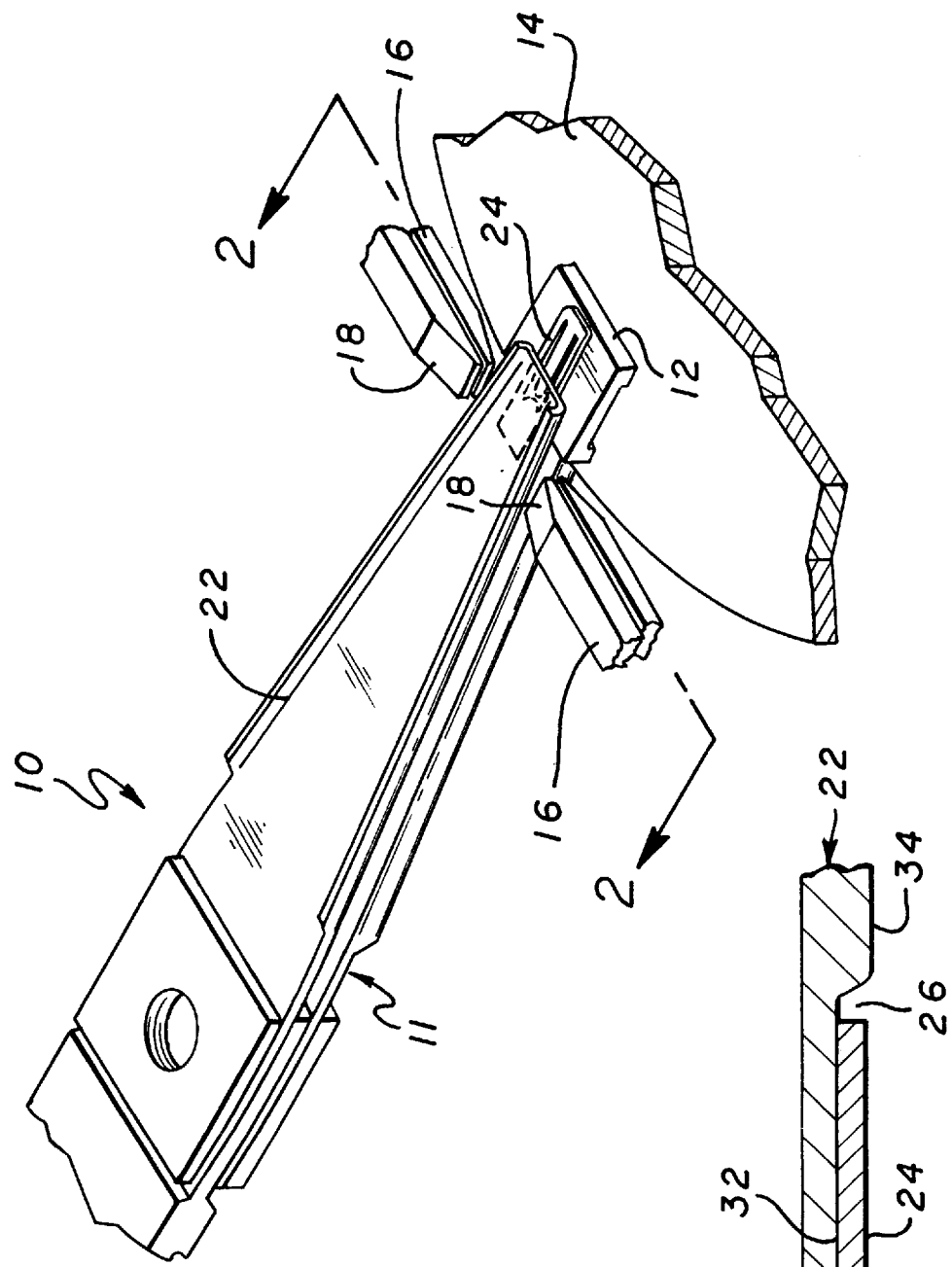
FIG. 1 is a perspective view of the invention disk drive suspension head gimbal assembly, and associated disk and lift arms, the flexure being shielded within a recess in the load beam body.
Figure 2:
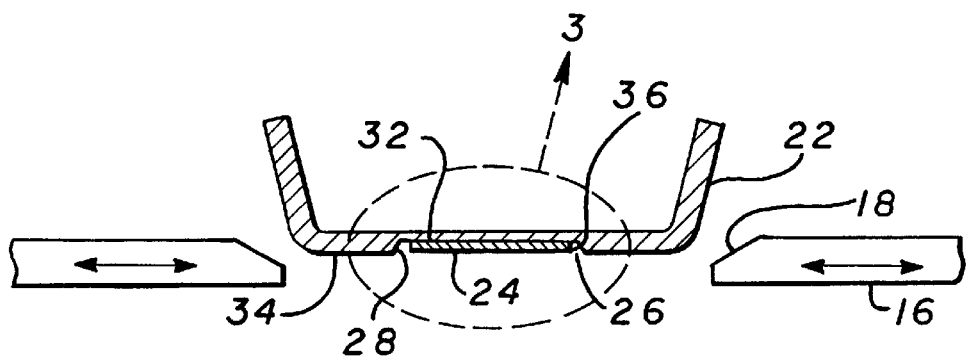
FIG. 2 is a view taken in line 2—2 in FIG. 1.

The invention provides a number of advantages in disk drive suspensions, including primarily reduced occasion for debris generation, reduced areas for accumulation of debris, and support for the suspension flexure against distortion from lift arm contact. In one embodiment, the invention advantages are realized by effecting a partial etch of the load beam in the area where the flexure overlies the load beam. The degree of etching is such that the opposing flexure is bodily received in the recess formed by the etching to be flush with the load beam surface or below flush, if desired. Existing flexures can be used in this arrangement or new styles of flexures can be developed specifically for this embodiment. As noted above, the etching removal of load beam portions will reduce the mass of the suspension, improving thereby its resonance and non-operating shock performance. The recessed flexure will not scrape debris from the rift arm to deposit on the suspension or the disk. Finally, as will be seen, opposed surfaces to be welded together are substantially planar, rather than each being curved like the straddle flexure of the prior art, making their interconnection a simple matter.

With reference now to the drawings in detail, in FIGS. 1–6 the invention disk drive suspension head gimbal assembly is shown at 10 carrying a head 12 operatively positioned adjacent disk 14. Lift arms 16 having camming surfaces 18 are disposed coplanar and at right angles to the upper and lower suspension assemblies 10, 11. The assembly 10 comprises a longitudinally extended load beam 22 adapted to being positioned adjacent the disk 14. For carrying the head 12 there is provided a longitudinally extended flexure 24 generally parallel with and supported by the load beam 22. The assembly 10 is adapted for shifting movement to and from the disk 14 by engagement therewith of the lifting arm camming surfaces 18, the lifting arms 16 traversing a predetermined path normal to the longitudinal axis of the load beam 22.

Figure 4:
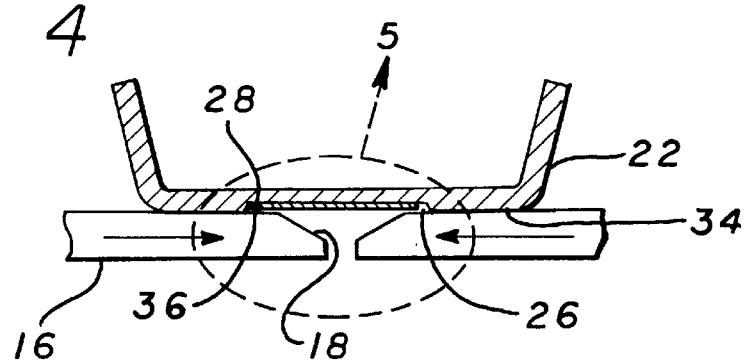
FIG. 4 is a view like FIG. 2, but showing the lift arms inward.
Figure 5:
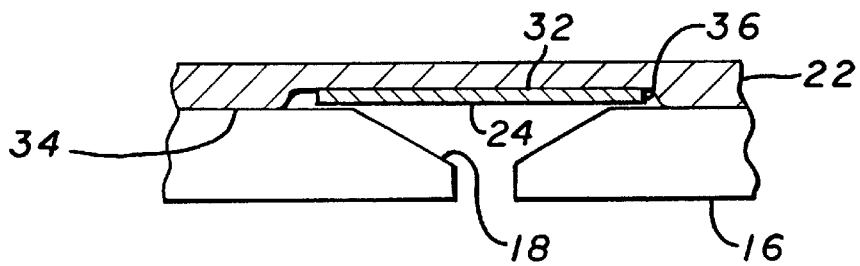
FIG. 5 is a view taken on line 5 in FIG. 4.
Figure 6:
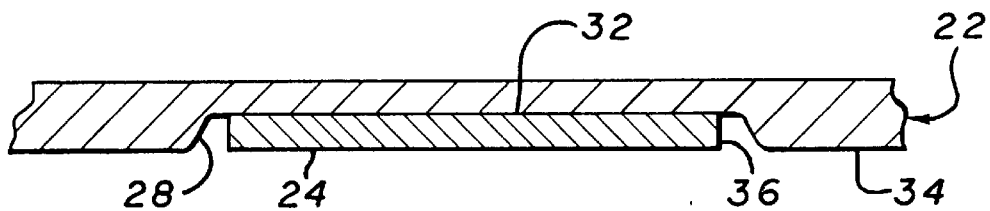
FIG. 6 is a fragmentary view in section of the suspension load beam body and flexure shielded therein.

The load beam 22 is surface etched in area 26 with suitable etchants to form an elongated recess 28 sized as shown to receive bodily the opposing portion 32 of flexure 24 to be flush with the load beam surface 34, See FIG. 6, or just below flush with the load beam surface 34, the latter being shown in FIGS. 3–5. Referring particularly to FIGS. 2–5, the lifting arms 16 are normally spaced out from the load beam 22 (FIG. 2) but may be brought to bear on the load beam by shifting inward in load beam surface 34 engagement (FIGS. 4 and 5). The likelihood of generation of debris from the contact of the camming lift arms 16 is reduced in accordance with the invention by having the flexure 24 bodily received in recess 28 such that its edges 36 do not engage the arms in the course of their predetermined path traversal of the load beam surface 34.

In a further embodiment, See FIGS. 7 and 8, the flexure 24 continues shielded from scraping contact with the lift arms 16, but the load beam 221 is not surface recessed. Instead, the load beam 221 is mechanically deflected outward from the general plane of the load beam surface 34, and the flexure is protected in the lee of the resulting load beam contour 36. The load beam area 38 is pushed out of the general plane of the load beam 221 by any suitable means to form the contour 44. The result is a pocket 42 above (or below) load beam 221 general plane. The pocket 42, like the recess 28 in the FIG. 1–6 embodiment, is sized to bodily receive the flexure 24. Again lift arm 16 contact with the flexure 24 is blocked and debris generation reduced. See FIG. 8. This embodiment does not afford the benefits of reduced mass in the load beam 221 except as the contour 36 when finished comprises less material than the portion of the load beam from which it was formed. The flexure 24 and load beam 221 are welded at 37, 39, areas of flat relation of these elements.

In FIGS. 9 and 10, a modification of the previous embodiment is shown. The shielding contour 44 in this embodiment is formed by a mechanical deflection of load beam 222 and comprises left and right curved portions 441, 442, essentially like the uprights of a contour 44 type deflection from the load beam 221 in the previous embodiment. The FIGS. 9 and 10 embodiment does remove some portion of the load beam 222 mass, more like the FIG. 1 embodiment in this regard, and does afford contour protection to the flexure 24 which is positioned within and between the contour portions 441 and 442. Lift arm 16 contact with the flexure 24 is blocked as shown, and debris generation is reduced.

Figure 11:
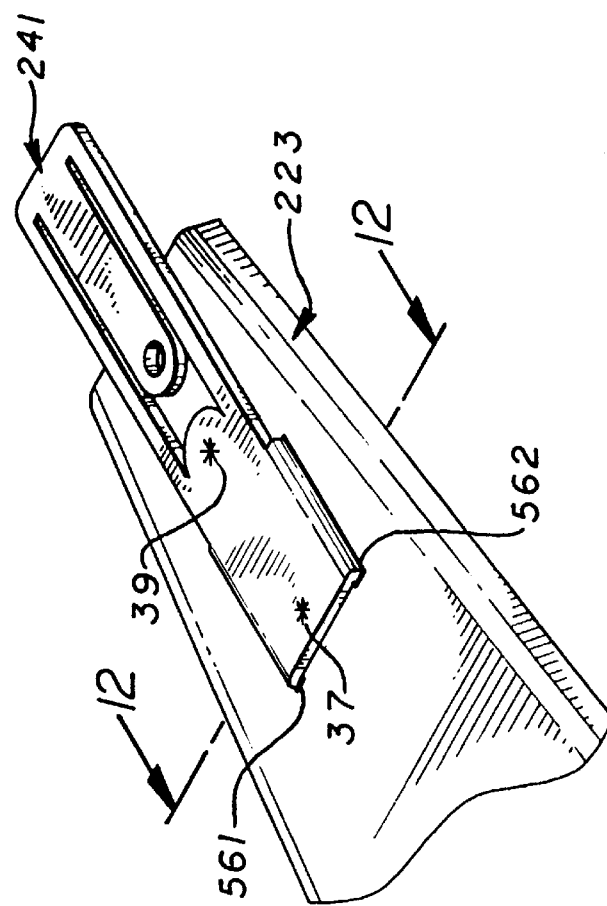
FIG. 11 is a perspective view of the invention disk drive suspension head gimbal assembly, the flexure edge flanges being received within slots in the load beam body, the flat of the flexure being supported by the load beam body against distortion; and, FIG. 12 is a view taken on line 12—12 in FIG. 11.
Figure 12:
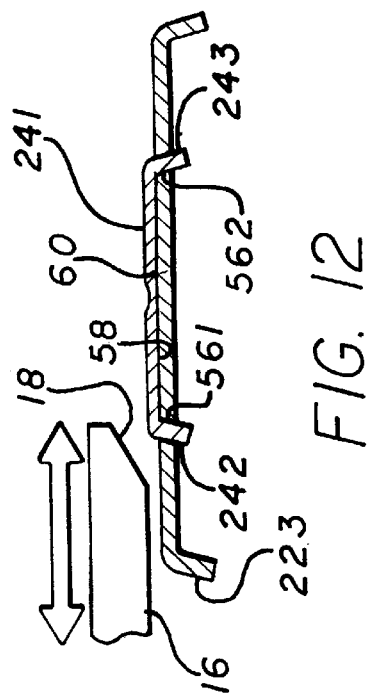

It will be noted that in the foregoing embodiments, the flexure 24 has been supported by contact with the load beam and free from contact with the lift arms 16 that could distort the flexure or alter its properties. Protection from distorting arm 16 contact is also provided by a further embodiment shown in FIGS. 11 and 12. In these Figures, the load beam 223 is modified to protect the flexure 241 somewhat differently than the load beams 22, 221 and 222 in previous embodiments protect flexure 24. Load beam 223 is provided with spaced apart, somewhat angled slots or kerfs 561, 562 which are sized and shaped, as well as located, to receive in registration the flanged edges 242, 243 of the flexure 241. In this manner, the vertical profile of the flexure 241 is greatly lowered, minimizing if not eliminating lift arm 16 contact with the flexure. The flexure 24 is intimately supported by the load beam 223 with the flat 58 of the flexure against the essentially planar opposing surface 60 of the load beam 223.

The attachment of the flexure to the load beam in any of the disclosed embodiments is preferably by welding. The flat to flat contact between flexure and load beam is a substantial convenience in the welding operation in comparison with the straddle type flexures which have curved portions opposite curved portions of the load beam providing a difficult welding situation.

The invention thus offers improved load beam/flexure assemblies in lift arm shifted suspensions, increased resonance values, reduced mass in such suspensions, improved non-operating shock performance, easier manufacturing, increased reliability in manufacture, lessened likelihood of flexure distortion in shifting operations, and generally a better suspension head gimbal assembly than previously known. The foregoing objects of the invention are thus met.

We claim:

1. An improved resonance and non-operating shock performance, low debris disk rive suspension head gimbal assembly for positioning a head at a disk, said assembly comprising a longitudinally extended load beam for positoning adjacent said disk, and for carrying said head a longitudinally extended flexure generally parallel with and supported by said load beam, said assembly being adapted for shifting movement relative to said disk upon engagement of a lifting arm with said load beam along a predetermined path including a portion of said flexure, said load beam being contoured to define a recess receiving said flexure portion below the surface of said load beam at the locus of said lifting arm engagement with said load beam so that a depth of said recess is greater than the height of said flexure portion, said flexure portion thus being shielded by said load beam against debris-generating contact between said lifting arm and said flexure portion during said lifting arm engagement.

2. The disk drive suspension head gimbal assembly according to claim 1, in which said load beam is locally deflected to define said recess.

3. The disk drive suspension head gimbal assembly according to claim 1, in combination with a disk drive and said lifting arm.

4. An improved resonance and non-operating shock performance, low debris disk drive suspension head gimbal assembly for positioning a head at a disk, said assembly comprising a load beam having an elongated body with side edges in a predetermined generally horizontal plane, a flexure comprising a flat portion and mounted on said body completely inward of said load beam body side edges and arranged for supporting the head in a different plane than said load beam body predetermined plane, said load beam being adapted to lifting away from said disk by a lift arm adjacent said assembly by cam engagement therewith, said load beam body being locally relieved to define a recess for receiving said flexure flat portion to a depth greater than the height of said flexure flat portion, whereby said flexure flat portion is below the surface plane of said load beam body at the locus of said lift arm cam engagement with said load beam body and, said flexure is shielded by said load beam against debris generating or distortion producing contact between said lifting arm and said flexure during said cam engagement with said load beam.

5. The disk drive suspension head gimbal assembly according to claim 4, in combination with a disk drive and said lifting arm.

\* \* \* \* \*